(12) United States Patent
Chen et al.

(10) Patent No.: US 9,872,011 B2
(45) Date of Patent: Jan. 16, 2018

(54) HIGH-SPEED DEPTH SENSING WITH A HYBRID CAMERA SETUP

(71) Applicant: Nokia Technologies Oy, Espoo (FI)

(72) Inventors: Xin Chen, Evanston, IL (US); Ruigang Yang, Lexington, KY (US)

(73) Assignee: Nokia Technologies Oy, Espoo (FI)

( * ) Notice: Subject to any disclaimer, the term of this patent is extended or adjusted under 35 U.S.C. 154(b) by 189 days.

(21) Appl. No.: 14/950,360

(22) Filed: Nov. 24, 2015

(65) Prior Publication Data

US 2017/0150123 A1    May 25, 2017

(51) Int. Cl.
*H04N 13/02* (2006.01)
*G06T 3/40* (2006.01)
*G06T 11/60* (2006.01)
*G06T 7/00* (2017.01)

(52) U.S. Cl.
CPC .......... *H04N 13/0242* (2013.01); *G06T 3/40* (2013.01); *G06T 7/002* (2013.01); *G06T 11/60* (2013.01)

(58) Field of Classification Search
CPC ....... H04N 13/0242; G06T 3/40; G06T 7/002; G06T 11/60
See application file for complete search history.

(56) References Cited

U.S. PATENT DOCUMENTS

| | | | |
|---|---|---|---|
| 9,565,416 B1 * | 2/2017 | Lewkow | H04N 5/23212 |
| 2013/0201291 A1 * | 8/2013 | Liu | G06F 3/012 |
| | | | 348/47 |
| 2013/0215027 A1 * | 8/2013 | Van Lydegraf | G06F 3/017 |
| | | | 345/158 |
| 2013/0321790 A1 * | 12/2013 | Kirby | H04N 13/0239 |
| | | | 356/3.14 |
| 2014/0313324 A1 * | 10/2014 | Bienkowski | G01N 21/9515 |
| | | | 348/135 |
| 2015/0172606 A1 * | 6/2015 | Niehsen | H04N 13/0221 |
| | | | 348/159 |
| 2015/0381965 A1 * | 12/2015 | Atanassov | H04N 5/23245 |
| | | | 348/47 |
| 2016/0029648 A1 * | 2/2016 | Schmitzek | A22B 5/007 |
| | | | 348/135 |
| 2016/0086311 A1 * | 3/2016 | Maehara | G06T 3/4053 |
| | | | 382/299 |
| 2016/0212411 A1 * | 7/2016 | Lindner | H04N 13/0271 |
| 2016/0261844 A1 * | 9/2016 | Kadambi | G01B 11/24 |
| 2016/0300361 A1 * | 10/2016 | Xie | G06T 7/2033 |

* cited by examiner

*Primary Examiner* — Christopher Findley
(74) *Attorney, Agent, or Firm* — Harrington & Smith

(57) ABSTRACT

In a method, a first video stream is received from a video camera, and a second video stream is received from a depth camera. A pixel mapping between the video camera and the depth camera is known. The video camera has an update rate greater than that of the depth camera. Optical flow in successive frames of the first video stream is measured, and a portion of the optical flow attributable to depth change is extracted. A scaling factor is calculated for each pixel in successive frames of the first video stream to determine whether a depth change has occurred. A perspective depth correction is applied to each pixel having a depth change. The perspective depth correction is based upon the depth of the corresponding pixel in the most recent frame from the second video stream. A combined video stream having an update rate of the video camera and depth information from the depth camera is obtained.

22 Claims, 8 Drawing Sheets

HIGH-SPEED DEPTH SENSING WITH A HYBRID CAMERA SETUP

TECHNICAL FIELD

The present invention relates to depth cameras, and, more particularly, to a depth camera having an improved frame rate of depth sensing through the use of a high-speed video camera.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application, and is not admitted to be prior art by inclusion in this section. Abbreviations that may be found in the specification and/or the drawing figures may be defined below at the end of the specification, but prior to the claims.

The present invention relates generally to the broad area of sensor fusion, in which sensory data from disparate sources are combined to improve the resulting data quality, usually in terms of accuracy and robustness.

Sensor fusion can be roughly divided into two categories: multi-sample fusion and multi-modal fusion. Multi-sample fusion takes advantage of redundancy in input data to significantly reduce the noise in individual sensor data, generating much cleaner output. Multi-modal fusion takes advantage of the often complimentary nature of different sensing modalities, for example, the ability of photometric stereo to capture detail with the metric reconstruction from stereo to reduce systematic errors in the fused data.

Unlike these pre-existing approaches to sensor fusion, the present invention is directed toward improving the frame rate of depth sensing through the use of a high-speed video camera.

SUMMARY

This section contains examples of possible implementations and is not meant to be limiting.

Current depth cameras have a limited update rate no higher than thirty frames per second. While this may be adequate for human/computer interaction, its application for high-speed motion sensing is limited. The present invention provides a system and a method for greatly improving the temporal frame rate of a contemporary depth camera.

The present system includes two cameras, one conventional depth camera and one high-speed conventional video camera. The basic idea is to use the conventional video camera to guide the temporal up-sampling of the depth frames. A depth interpolation scheme is included. The output of this system is an RGB-D (red/green/blue-depth) video stream with an update rate of the high-speed camera.

In an exemplary embodiment, a method comprises receiving a first video stream from a video camera. The video camera may be a high-speed video camera capable of capturing video at 200 Hz. The method further comprises receiving a second video stream from a depth camera. The depth camera is typically capable of capturing video at only 30 Hz. The pixel mapping between the video camera and the depth camera is known. As is the case here, the video camera has an update rate greater than that of the depth camera.

The method further comprises measuring optical flow in successive frames of the first video stream, and extracting a portion of the optical flow attributable to depth change. A scaling factor is calculated for each pixel in successive frames of said first video stream to determine whether a depth change has occurred.

Subsequently, a perspective depth correction is applied to each pixel having a depth change. The perspective depth correction is based upon the depth of the corresponding pixel in the most recent frame from the second video stream. Finally, a combined video stream having an update rate of the video camera and depth information from said depth camera is output.

According to another aspect, an apparatus comprises a depth camera, and a video camera having an update rate greater than that of the depth camera. The apparatus also comprises at least one processor, and at least one memory including computer program code. The at least one memory and the computer program code are configured, with the at least one processor, to cause the apparatus to perform the method described above.

According to still another aspect, an apparatus comprises means for performing each step of the method described above.

According to yet another aspect, a computer program product comprises a computer-readable storage medium bearing computer program code embodied therein for use with a computer, the computer program code comprising code for performing the method described above.

DETAILED DESCRIPTION OF THE DRAWINGS

Figure 1:
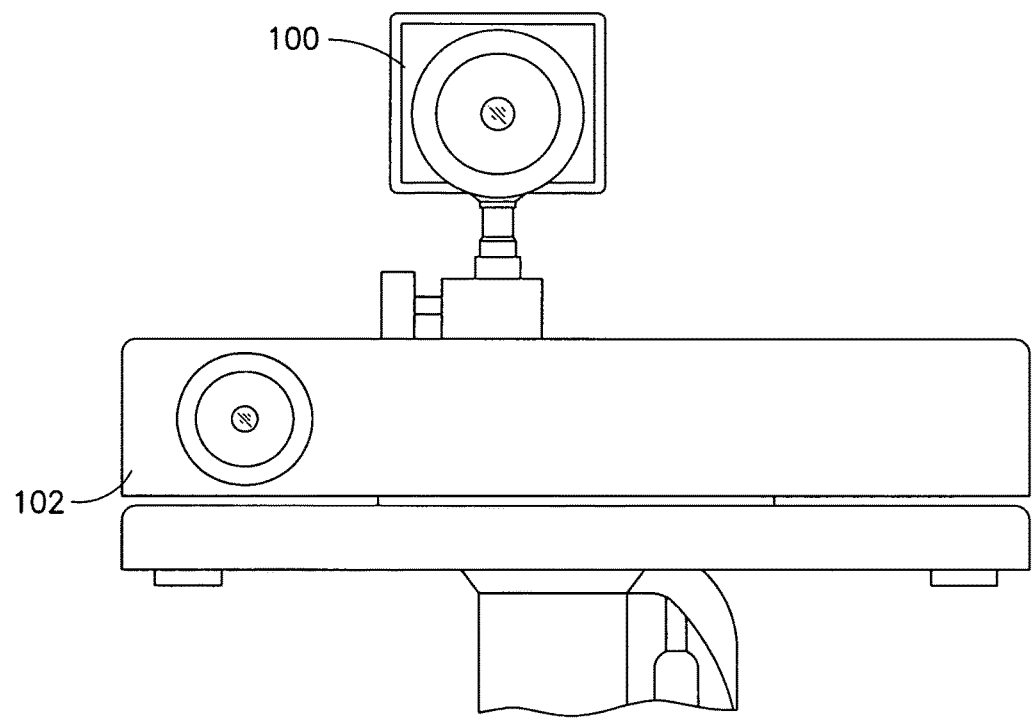
FIG. 1 is a perspective view of a hybrid camera setup used in the practice of the present invention.

As shown in FIG. 1, the present hybrid camera setup contains a high-speed video camera 100 and a conventional depth camera 102. The two cameras 100, 102 may be disposed in a side-by-side relationship, as shown in FIG. 1. Alternatively, they may be placed behind a beam splitter to share the same principal direction. In either case, the physical configuration of the hybrid camera setup is carefully calibrated and adjusted to provide a known pixel mapping between the depth camera and the video camera.

For simplicity in notation, it will be assumed that the color image and the depth image are aligned either optically or through a re-mapping process. In addition, it will be assumed that the optical flow in the high-speed video image can be calculated. The problem can now be formally defined as, given color image I(t) where t∈{0, 1, 2, . . . n}, the optical flow f(t) between frame t and t+1, and the depth frame $D(t_k)$ where $t_k \in \{0, \Delta, 2\Delta, \ldots\}$, to estimate the depth frames $D(t)$ where $t \neq m\Delta$, where m is an integer.

A straightforward method to estimate $D(t)$ is to interpolate the depth map using the optical flow. However, as optical flow is calculated with images, it is difficult to use the two-dimensional (2D) signal to guide the interpolation of a three-dimensional (3D) signal. Therefore, a perspective depth correction method is introduced to make the interpolation more accurate.

Figure 2:
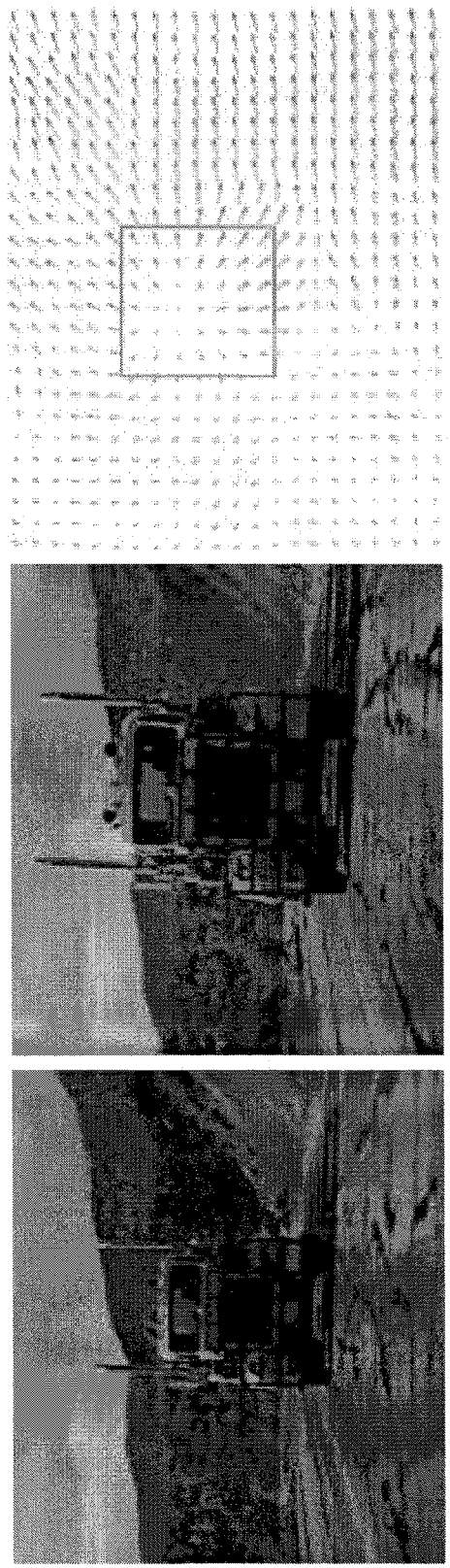
FIG. 2 illustrates expanding optical flow.

Under perspective projection with fixed focal length, a rigid object gets bigger when it moves closer to a camera and appears smaller when it moves away. As shown in FIG. 2, the size change of the object shows up on the estimated optical flow as local flow expansion or shrinking. In the present invention, this cue is used to automatically infer the depth changes of moving objects. It is noteworthy that this observation is based on the assumption of local rigidity, that is, the local structure of the objects in the scene undergoes rigid motion in short time intervals, even though deformable objects are allowed in the video.

The optical flow of an object does not show up as pure expansion or shrinkage unless the object is at the center of the image and is moving along the optical axis of the camera. In general cases, the optical flow of the object is a combination of the motion along the depth direction and the motion parallel to the plane of the camera. To extract the portion of the flow caused by depth change, Helmholtz-Hodge decomposition is first applied to decompose the two-dimensional (2D) optical flow into a divergence-free vector field and a divergence field. The divergence-free vector field is ignored and the divergence field is given the following test to see whether it is caused by the depth change of a rigid object.

Figure 3:
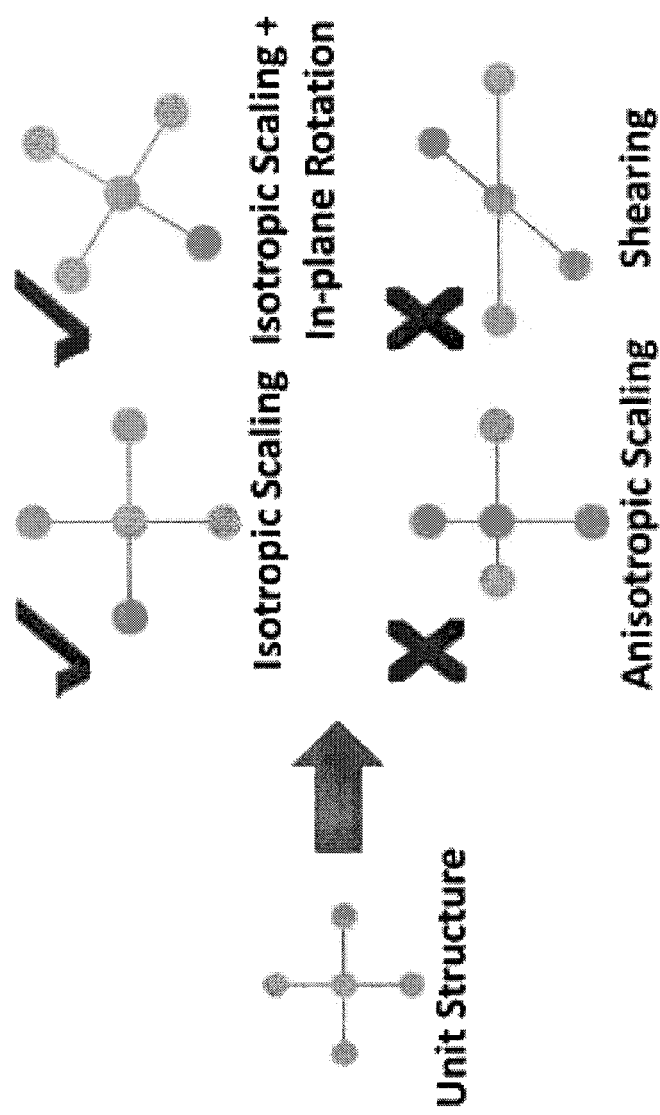
FIG. 3 illustrates four of the possible shapes that could be taken by a unit structure in the next frame under the rigidity assumption.

The test is performed based on a local structure consisting of a pixel and its four spatial neighbors; the local structure is referred to as a unit structure. The five pixels in the unit structure are traced into the next frame by the pre-computed optical flow. FIG. 3 shows four of the possible shapes the unit structure could take in the next frame assuming rigidity.

1. If the unit structure is scaled evenly in all directions (isotropic scaling), it suggests that the corresponding three-dimensional (3D) points of the unit structure pixels are at the same depth and move toward (or away from) the camera.

2. If the unit structure is evenly scaled and rotated (isotropic scaling+in-plane rotation), the motion of the corresponding three-dimensional (3D) structure is exactly the same as in the first case except that there is also in-image-plane rotation.

3. If the unit structure is unevenly scaled (anisotropic scaling), it could result from depth variation among the points of the structure, causing different points to move at different observed velocities.

4. If the unit structure is skewed (shearing), it may be caused by off-image-plane rotation. Other shapes of the unit structure are possible, and may be caused by either the combination of the above rigid motions or non-rigid motion.

In the present invention, occurrences of the first two cases are sought, and used to perform depth correction.

Figure 4:
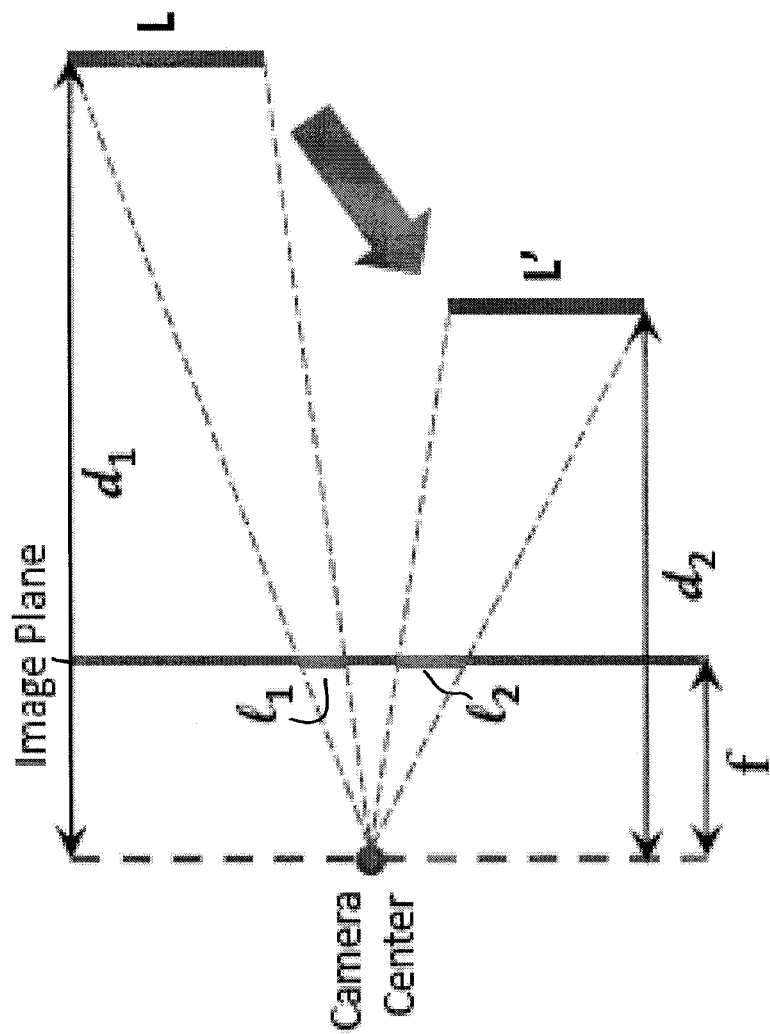
FIG. 4 explains the relation between scaling factor and depth change using a single line segment.

In both of the first two cases, the unit structure is evenly scaled along all directions, and the scaling factor can be calculated using the average length of the four edges of the unit structure. FIG. 4 explains the relation between the scaling factor and depth change using a single line segment. As line segment L moves closer to the camera, its projection size on the image plane changes from $l_1$ to $l_2$. Assuming that the unknown line segment's depth changes from $d_1$ to $d_2$, we have:

$$\left. \begin{array}{l} l_1 = \dfrac{f}{d_1} L \\ l_2 = \dfrac{f}{d_2} L \end{array} \right\} \Rightarrow s = \dfrac{l_2}{l_1} = \dfrac{d_1}{d_2} \qquad \text{(Equation 1)}$$

where f is the focal length, s is the scaling factor of the image of the line segment.

Equation 1 indicates that the length of the projection of the line segment is inversely proportional to the depth of the position of the line segment. Therefore, by calculating the scaling factor of the line segment, one can learn its relative depth change without knowing its absolute depth value.

The same property holds for the unit structure. Let $d^t(p)$ be the depth of the center pixel p of the unit structure in frame t, $d^{t+1}(p')$ be the depth of the corresponding pixel p' in the next frame, and s be the scaling factor of the unit structure, and the following perspective depth correction constraint can be defined:

$$d^t(p) - s \cdot d^{t+1}(p') = 0 \qquad \text{(Equation 2)}$$

Figure 5:
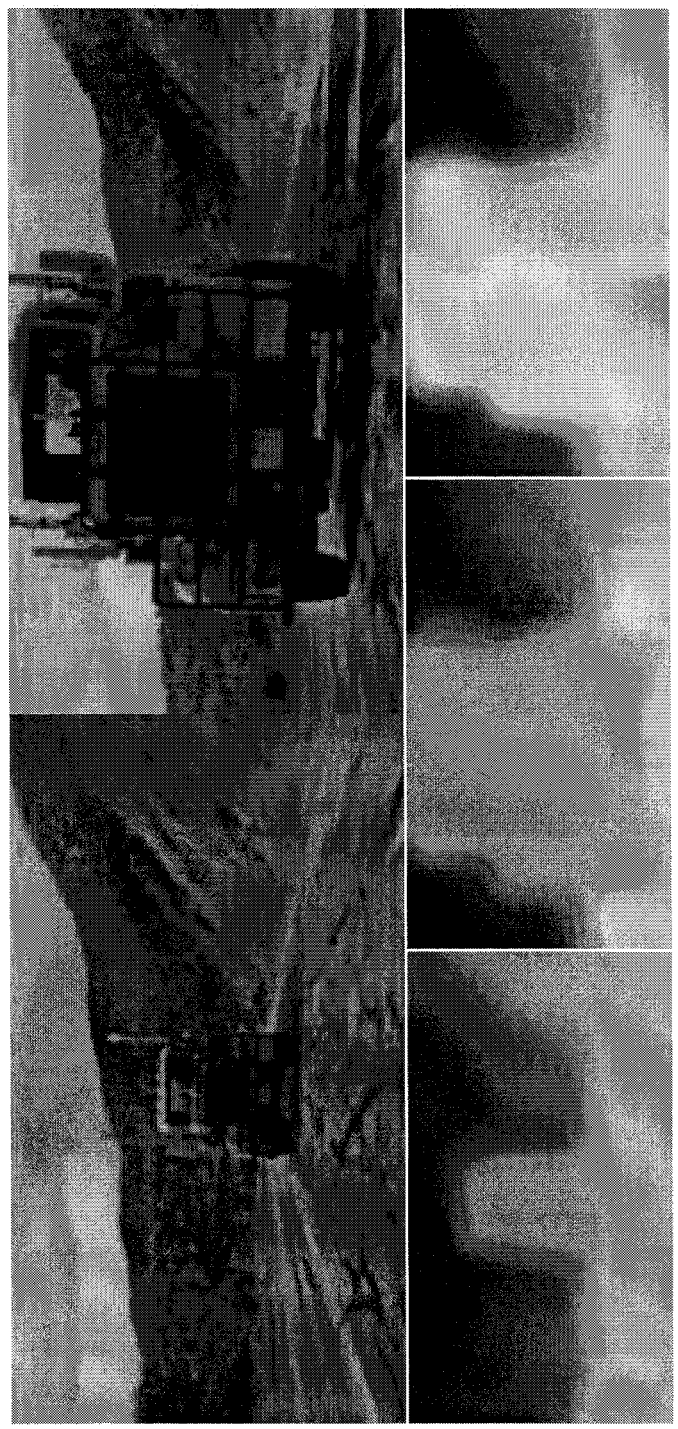
FIG. 5 illustrates the effectiveness of perspective depth correction.

FIG. 5 shows the effectiveness of perspective depth correction. The first row shows the first and last frame from a video. In the second row, the left image is the depth map of the first frame, and the right two images are depth maps of the last frame, without and with perspective depth correction, respectively. If the depth correction is not applied on the input video, the depth value will be propagated from the first frame to the last frame under the smoothness constraints defined on spatial and temporal neighbors. Thus, the same depth value on the truck in the first frame is passed onto the last frame, which is obviously invalid. Applying the perspective depth correction produces correct depth value in the last frame.

In addition to the perspective depth correction constraint, a smoothness constraint that spatial and temporal neighboring pixels should have the same depth value if they share the same color can be incorporated. For each pixel p in the image sequence, we have:

$$d(p) - \sum_{q \in N_p} w_{pq} d(q) = 0 \qquad \text{(Equation 3)}$$

where $d(p)$ is the depth value of pixel p and $w_{pq}$ is the normalized weight between pixel p and q, which is inversely proportional to the color difference of these two pixels. $N_p$ is a set consisting of p's eight spatial neighbors in the current frame and one temporal neighbor in the next frame, which is located using optical flow. Equation 3 for each pixel is stacked as a large sparse linear equation $Ax=0$, where A is the weight matrix and x is the depth vector defined on every pixel.

The perspective depth correction constraints (Equation 2) are stacked as a linear equation $Cx=d$. Combining these constraints together we have a linear system:

$$\begin{bmatrix} A \\ C \end{bmatrix} x = \begin{bmatrix} 0 \\ d \end{bmatrix} \qquad \text{(Equation 4)}$$

The above linear system can be solved using any standard technique. In practice, the depth map can be calculated using both forward and backward propagations to get more robust results.

Figure 6:
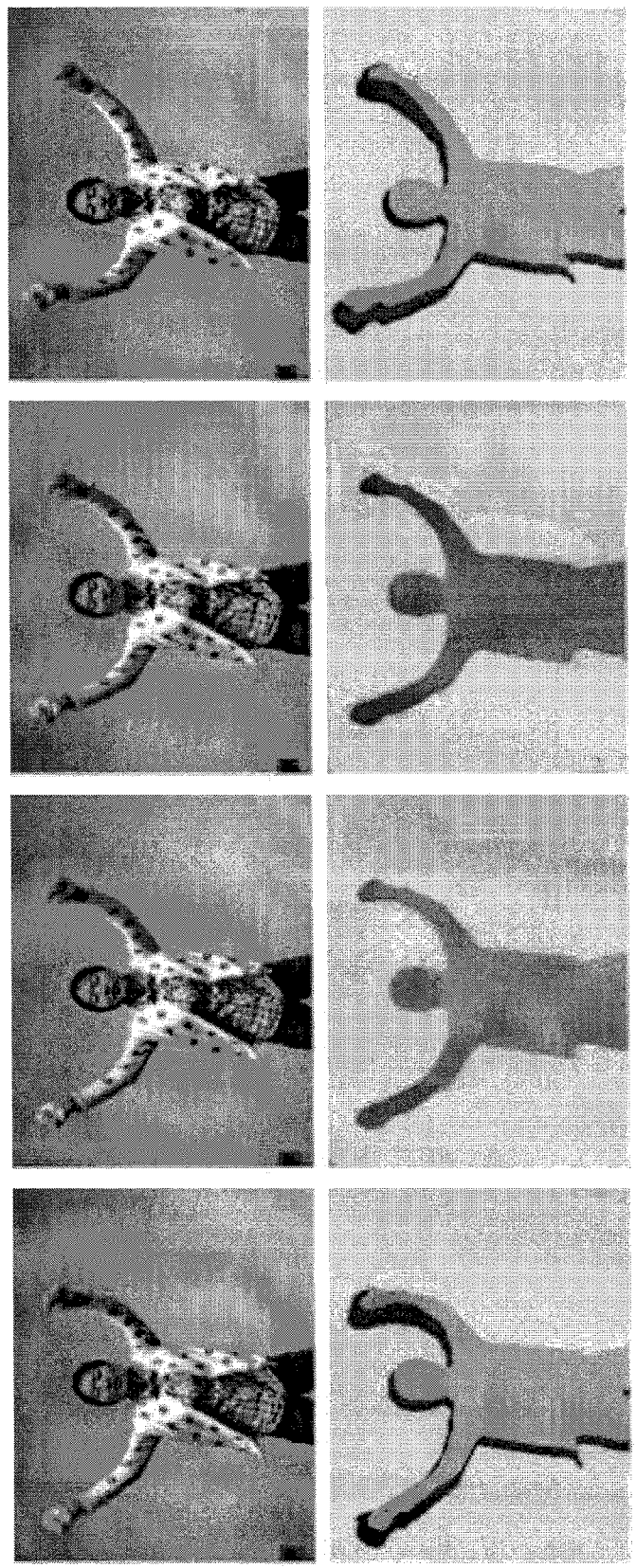
FIG. 6 presents results on temporal depth enhancement.

A set of representative results is presented in FIG. 6. The top row are the high-speed color images, and the second row are the depth maps, in which the left-most and the right-most images are captured by the low-speed depth camera. The intermediate depth maps are estimated in accordance with the present invention. The high-speed video is captured at 200 Hz, while the depth video is captured at 30 Hz. The optical flow movement between two depth frames can be as large as 100 pixels. In FIG. 6, all of the interpolated frames are not shown in between. In the two interpolated depth frames, one can see that there are no missing depth values, which are represented as black areas in the input depth maps. These areas are caused by the occlusions because of the baseline between the two cameras. As a result of the propagation algorithms, these values are filled in correctly in the interpolated depth maps.

Figure 7:
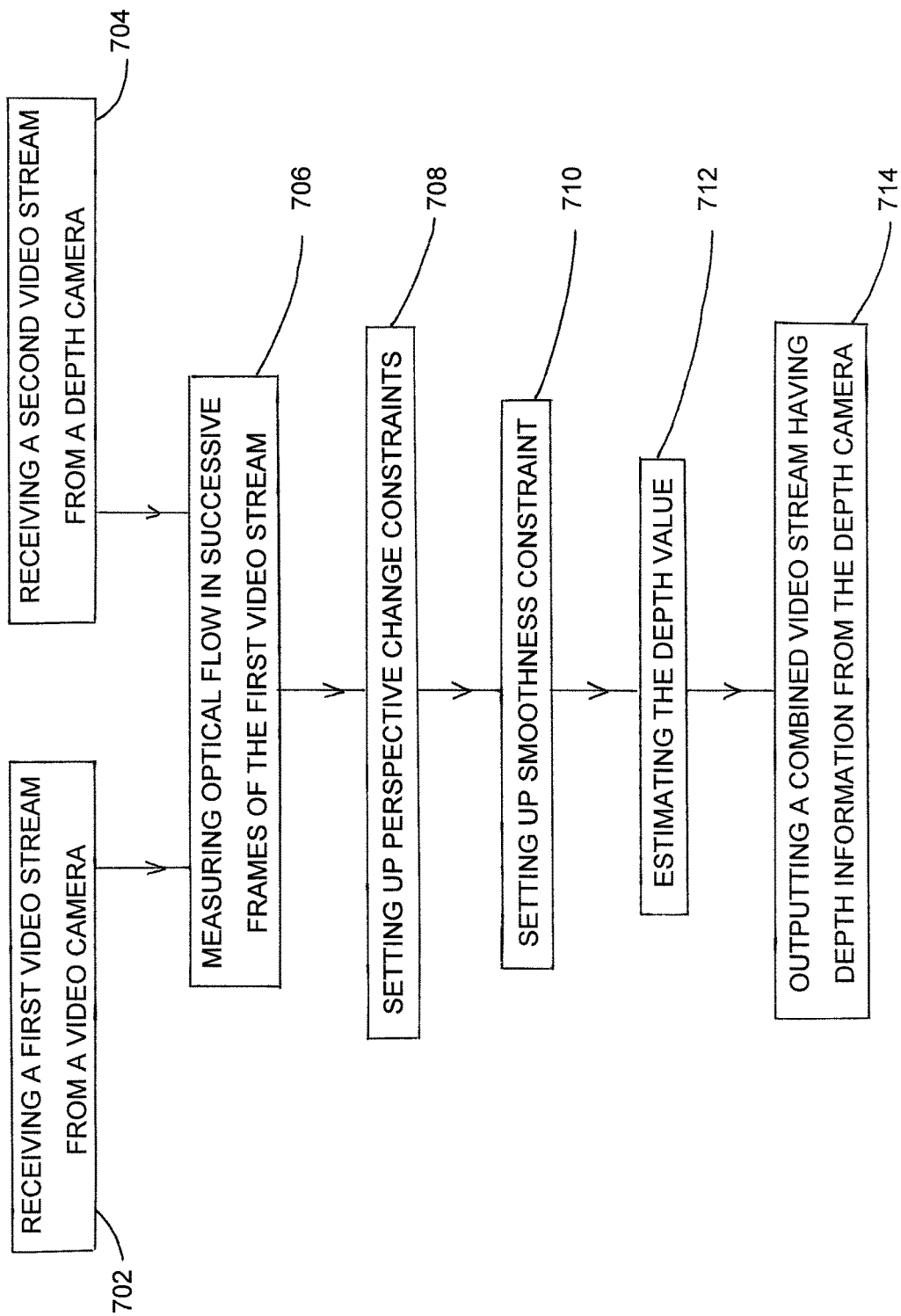
FIG. 7 is a flowchart illustrating the method in accordance with an exemplary embodiment.

FIG. 7 is a flowchart illustrating the method in accordance with an exemplary embodiment. In block 702, a first video stream is received from a video camera.

In block 704, a second video stream is received from a depth camera. A pixel mapping between the video camera and the depth camera is known, and the video camera has an update rate greater than that of the depth camera.

In block 706, optical flow in successive frames of the first video stream is measured.

In block 708, perspective change constraints are set up.

In block 710, smoothness constraints are set up.

In block 712, the depth value is estimated.

In block 714, a combined video stream having an update rate of the video camera and depth information from said depth camera is output.

Figure 8:
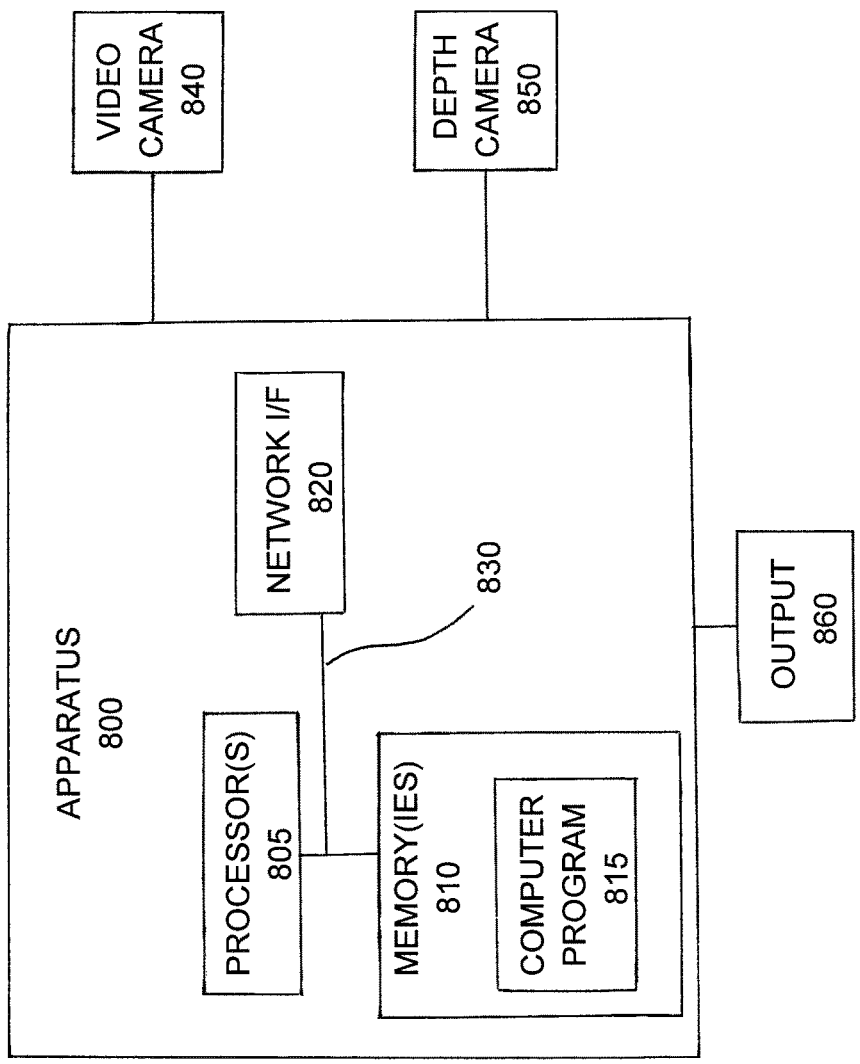
FIG. 8 is an exemplary system for practicing various exemplary embodiments.

FIG. 8 shows an exemplary system for practicing various embodiments. The system includes an apparatus 800 having one or more processors 805, one or more memories 810, and one or more network interfaces 820, interconnected using one or more buses 830. The one or more memories 810 include a computer program 815 defined to cause the apparatus to perform one or more of the operations described herein.

A high-speed video camera 840 and a depth camera 850 provide input to the apparatus 800. A combined video stream is sent to the output 860.

As will be appreciated by one skilled in the art, aspects of the present invention may be embodied as an apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, and so forth, or any suitable combination of the foregoing.

Computer program code for carrying out operations for aspects of the present invention may be written in any combination of one or more programming languages, including an object-oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable-medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any and all means or step plus function elements in the claims below are intended to include any structure, material, or act for performing the function in combination with other claimed elements as specifically claimed. The description of various embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. An apparatus comprising:
   a depth camera;
   a video camera, said video camera having an update rate greater than that of said depth camera;
   at least one processor; and
   at least one memory including computer program code, the at least one memory and the computer program code configured, with the at least one processor, to cause the apparatus to perform:
   receiving a first video stream from the video camera;
   receiving a second video stream from the depth camera, wherein a pixel mapping between the video camera and the depth camera is known;
   measuring optical flow in successive frames of said first video stream;
   extracting a portion of the optical flow attributable to depth change;
   calculating a scaling factor for each pixel in successive frames of said first video stream to determine whether a depth change has occurred;
   applying a perspective depth correction to each pixel having a depth change, said perspective depth correction being based upon the depth of the corresponding pixel in the most recent frame from the second video stream; and
   outputting a combined video stream having an update rate of the video camera and depth information from said depth camera.

2. The apparatus as claimed in claim 1, wherein the video camera has an update rate of 200 Hz.

3. The apparatus as claimed in claim 1, wherein the depth camera has an update rate of 30 Hz.

4. The apparatus as claimed in claim 1, wherein images from said first video stream and images from said second video stream are aligned either optically or through a remapping process.

5. The apparatus as claimed in claim 1, wherein extracting a portion of the optical flow attributable to depth change comprises:
   applying Helmholtz-Hodge decomposition to decompose a two-dimensional optical flow into a divergence-free vector field and a divergence field;
   ignoring the divergence-free vector field; and
   testing the divergence field to determine whether divergence is caused by the depth change of a rigid object.

6. The apparatus as claimed in claim 5, wherein the testing is carried out by comparing unit structures formed by pixels and four spatial neighbors thereof in successive frames to determine whether the unit structures have changed in either size or orientation.

7. The apparatus as claimed in claim 1, wherein the at least one memory and the computer program code are further configured, with the at least one processor, to provide spatial and temporal neighboring pixels with the same depth correction when they have the same color.

8. A method comprising:
   receiving a first video stream from a video camera;
   receiving a second video stream from a depth camera, wherein a pixel mapping between the video camera and the depth camera is known, and wherein said video camera has an update rate greater than that of said depth camera;
   measuring optical flow in successive frames of said first video stream;
   extracting a portion of the optical flow attributable to depth change;
   calculating a scaling factor for each pixel in successive frames of said first video stream to determine whether a depth change has occurred;
   applying a perspective depth correction to each pixel having a depth change, said perspective depth correction being based upon the depth of the corresponding pixel in the most recent frame from the second video stream; and
   outputting a combined video stream having an update rate of the video camera and depth information from said depth camera.

9. The method as claimed in claim 8, wherein images from said first video stream and images from said second video stream are aligned either optically or through a remapping process.

10. The method as claimed in claim 8, wherein extracting a portion of the optical flow attributable to depth change comprises:

applying Helmholtz-Hodge decomposition to decompose a two-dimensional optical flow into a divergence-free vector field and a divergence field;

ignoring the divergence-free vector field; and testing the divergence field to determine whether divergence is caused by the depth change of a rigid object.

11. The method as claimed in claim 10, wherein the testing is carried out by comparing unit structures formed by pixels and four spatial neighbors thereof in successive frames to determine whether the unit structures have changed in either size or orientation.

12. The method as claimed in claim 8, further comprising:
providing spatial and temporal neighboring pixels with the same depth correction when they have the same color.

13. An apparatus comprising:
means for receiving a first video stream from a video camera;

means for receiving a second video stream from a depth camera, wherein a pixel mapping between the video camera and the depth camera is known, and wherein said video camera has an update rate greater than that of said depth camera;

means for measuring optical flow in successive frames of said first video stream;

means for extracting a portion of the optical flow attributable to depth change;

means for calculating a scaling factor for each pixel in successive frames of said first video stream to determine whether a depth change has occurred;

means for applying a perspective depth correction to each pixel having a depth change, said perspective depth correction being based upon the depth of the corresponding pixel in the most recent frame from the second video stream; and means for outputting a combined video stream having an update rate of the video camera and depth information from said depth camera.

14. The apparatus as claimed in claim 13, wherein images from said first video stream and images from said second video stream are aligned either optically or through a remapping process.

15. The apparatus as claimed in claim 13, wherein extracting a portion of the optical flow attributable to depth change comprises:
applying Helmholtz-Hodge decomposition to decompose a two-dimensional optical flow into a divergence-free vector field and a divergence field;

ignoring the divergence-free vector field; and testing the divergence field to determine whether divergence is caused by the depth change of a rigid object.

16. The apparatus as claimed in claim 15, wherein the testing is carried out by comparing unit structures formed by pixels and four spatial neighbors thereof in successive frames to determine whether the unit structures have changed in either size or orientation.

17. The apparatus as claimed in claim 13, further comprising:
means for providing spatial and temporal neighboring pixels with the same depth correction when they have the same color.

18. A computer program product comprising a non-transitory computer-readable storage medium bearing computer program code embodied therein for use with an apparatus, the computer program code comprising code for performing at least the following:
receiving a first video stream from a video camera;

receiving a second video stream from a depth camera, wherein a pixel mapping between the video camera and the depth camera is known, and wherein said video camera has an update rate greater than that of said depth camera;

measuring optical flow in successive frames of said first video stream;

extracting a portion of the optical flow attributable to depth change;

calculating a scaling factor for each pixel in successive frames of said first video stream to determine whether a depth change has occurred;

applying a perspective depth correction to each pixel having a depth change, said perspective depth correction being based upon the depth of the corresponding pixel in the most recent frame from the second video stream; and outputting a combined video stream having an update rate of the video camera and depth information from said depth camera.

19. The computer program product as claimed in claim 18, wherein images from said first video stream and images from said second video stream are aligned either optically or through a remapping process.

20. The computer program product as claimed in claim 18, wherein extracting a portion of the optical flow attributable to depth change comprises:
applying Helmholtz-Hodge decomposition to decompose a two-dimensional optical flow into a divergence-free vector field and a divergence field;

ignoring the divergence-free vector field; and testing the divergence field to determine whether divergence is caused by the depth change of a rigid object.

21. The computer program product as claimed in claim 20, wherein the testing is carried out by comparing unit structures formed by pixels and four spatial neighbors thereof in successive frames to determine whether the unit structures have changed in either size or orientation.

22. The computer program product as claimed in claim 18, further comprising code for performing:
providing spatial and temporal neighboring pixels with the same depth correction when they have the same color.

* * * * *